United States Patent [19]

Kanzaki et al.

[11] Patent Number: 5,783,892
[45] Date of Patent: Jul. 21, 1998

[54] STATOR FOR DYNAMOELECTRIC MACHINES

[75] Inventors: Hidetoshi Kanzaki; Takayuki Hattori, both of Yokkaichi; Akihiko Dousaka, Mie-ken, all of Japan

[73] Assignee: Kabushiki Kaisha Toshiba, Kanagawa-ken, Japan

[21] Appl. No.: 634,898

[22] Filed: Apr. 26, 1996

[30] Foreign Application Priority Data

Jun. 26, 1995 [JP] Japan .................. 7-159129
Jul. 25, 1995 [JP] Japan .................. 7-189406

[51] Int. Cl.$^6$ ............................................. H02K 1/12
[52] U.S. Cl. .................. 310/258; 310/89; 310/91; 310/58; 310/57
[58] Field of Search .................. 310/258, 89, 91, 310/51, 58

[56] References Cited

U.S. PATENT DOCUMENTS

| | | | |
|---|---|---|---|
| 3,300,666 | 1/1967 | Frazier et al. | 310/42 |
| 4,284,920 | 8/1981 | Nelson | 310/217 |
| 4,450,373 | 5/1984 | Miller et al. | 310/51 |
| 4,716,648 | 1/1988 | Nel | 29/586 |
| 4,975,613 | 12/1990 | Brem et al. | 310/258 |
| 5,475,275 | 12/1995 | Dohogne et al. | 310/89 |

FOREIGN PATENT DOCUMENTS

| | | | |
|---|---|---|---|
| 0 320 252 A2 | 6/1989 | European Pat. Off. | |
| 29-1658 | 3/1954 | Japan . | |
| 5-30689 | 2/1993 | Japan | H02K 1/18 |
| WO 91/03094 | 3/1991 | WIPO . | |

Primary Examiner—Thomas M. Dougherty
Assistant Examiner—Timothy A. Williams
Attorney, Agent, or Firm—Limbach & Limbach, LLP

[57] ABSTRACT

A stator for a dynamoelectric machine includes a stator frame including a main frame and axial ribs cylindrically arranged in the main frame to extend parallel with an axis of rotation of a rotor such that a space is defined. The main frame includes a bottom wall, side walls standing from both radial ends of the bottom wall respectively, and connecting walls standing from both axial ends of the bottom wall and interconnecting both ends of the side walls, respectively. Each axial rib has opposite ends connected to the respective connecting walls and an intermediate portion between the ends. The intermediate portion of each axial rib is spaced away from the side walls. A stator core is formed of a stack of laminations of steel sheets and fitted in the space defined by the axial ribs to be held in position.

9 Claims, 15 Drawing Sheets

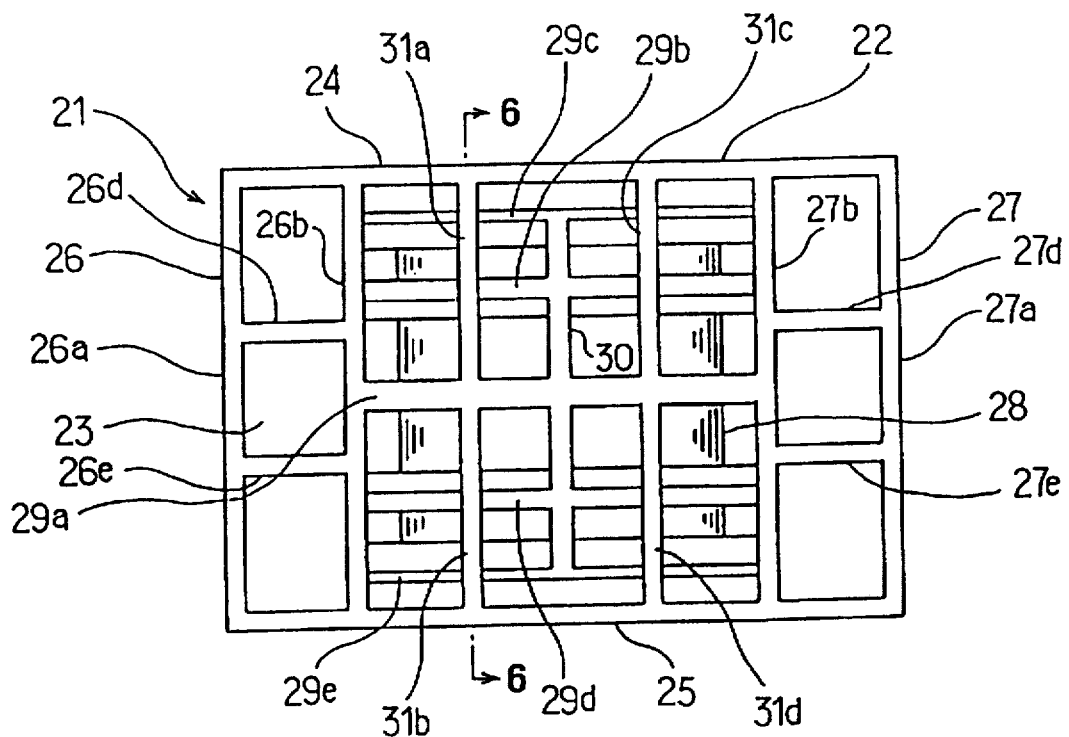
F I G. 5
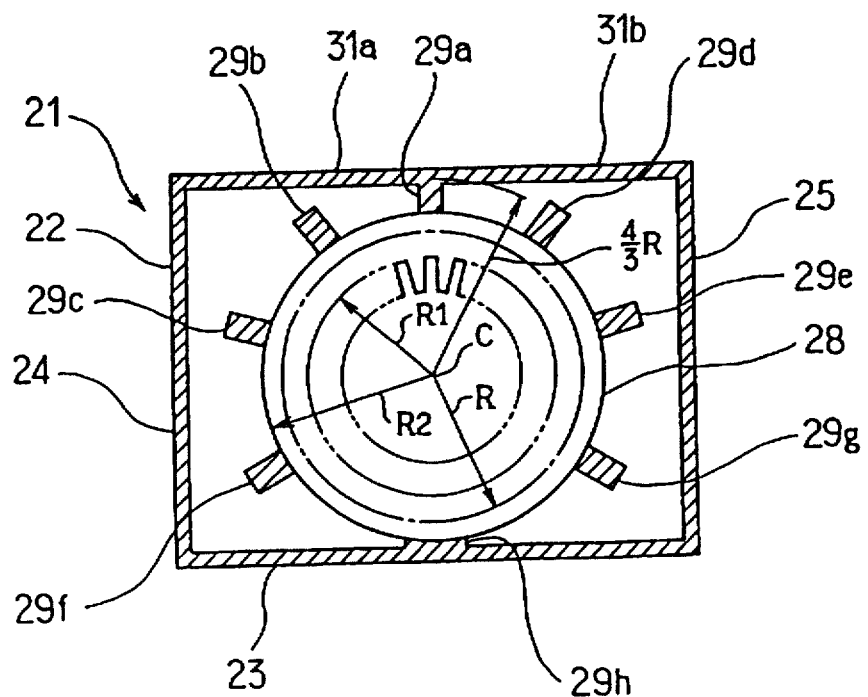
F I G. 6

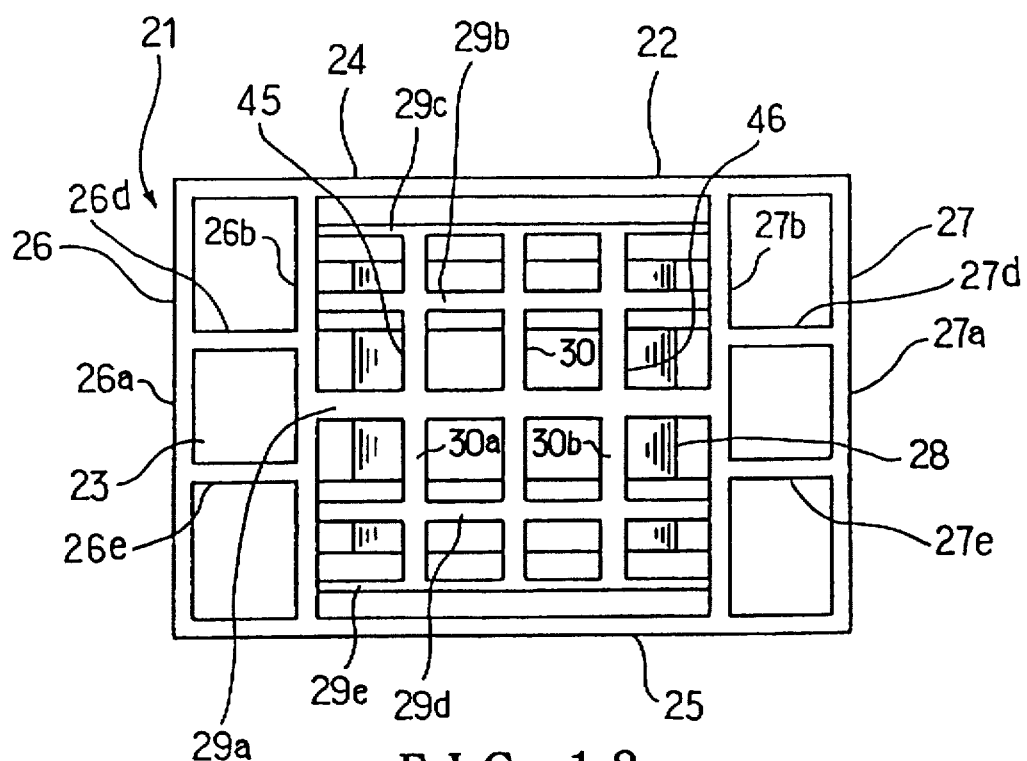
F I G. 1 8
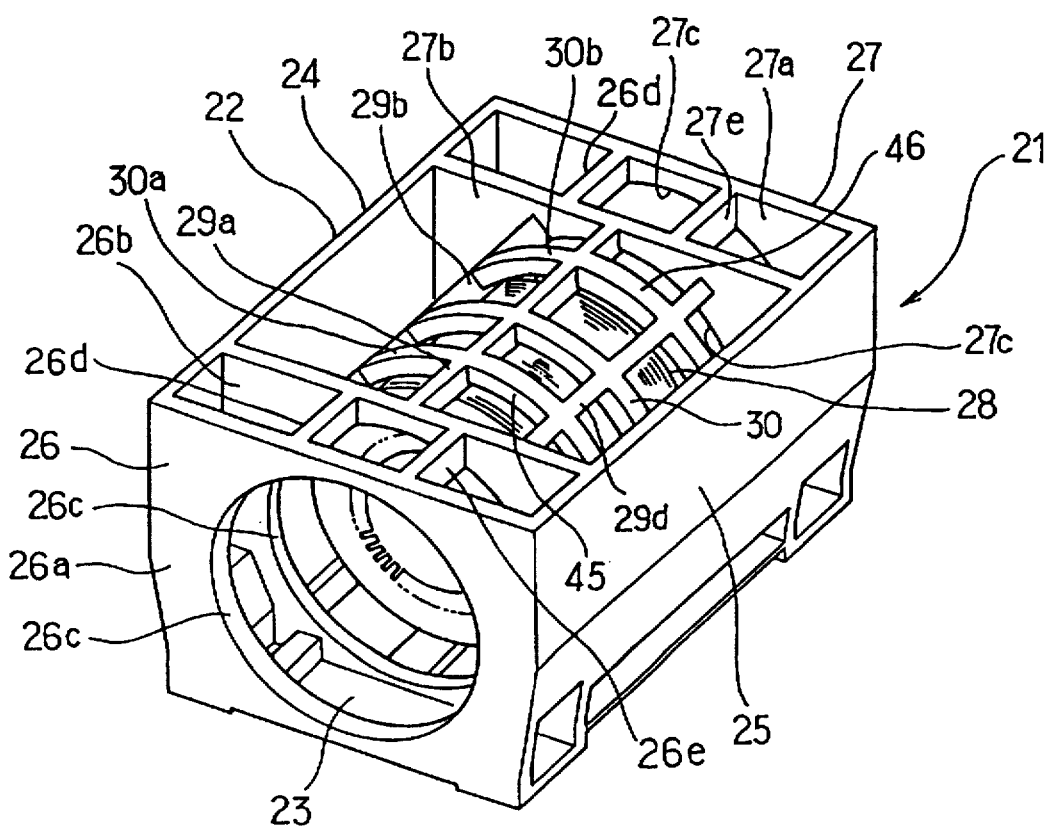
F I G. 1 9

5,783,892

1

STATOR FOR DYNAMOELECTRIC MACHINES

BACKGROUND OF THE INVENTION

1. Field of the Invention

This invention relates to a stator suitable for dynamoelectric machines whose rated powers range from several hundred kilowatts to several thousand kilowatts and which are typically used in pumps, refrigerators, blowers or the like.

2. Description of the Prior Art

One of conventional stators of the above-described type is shown in FIGS. 24 to 26. The stator for a dynamoelectric machine provided for accommodating a generally annular stator core 9 and comprises a stator frame 1 composed of a main frame 2. The main frame 2 comprises a bottom wall 3, side walls 4 and 5 standing from both radial ends of the bottom wall 3 with respect to the stator core 9 respectively, connecting walls 6 and 7 standing from both axial ends of the bottom wall 3 with respect to the stator core 9 to be connected to ends of the side walls 4 and 5, respectively, and a reinforcing wall 8 standing from an axial central portion of the bottom wall 3 relative to the stator core 9 which is connected to the central portions of the side walls 4 and 5. The connecting walls 6 and 7 include outer walls 6a, 7a and inner walls 6b, 7b respectively. Outer surfaces of the outer walls 6a, 7a serve as mounting faces on which bearing brackets are to be mounted, respectively. The connecting walls 6, 7 and the reinforcing wall 8 are formed with respective substantially circular through holes through which the stator core 9 is taken into and out of the stator frame 1. Only one 8a of the holes is shown in FIG. 26. Each hole has approximately the same diameter as the external diameter of the stator core 9.

A plurality of, for example, ten axial ribs 10a to 10j are provided in the stator main frame 2 to be cylindrically arranged so that an inner space is defined. Both ends of the axial ribs 10a to 10j are integrally connected to the inner walls 6a and 7a of the connecting walls 6 and 7 respectively. The axial ribs 10a to 10j are further connected at the central portions thereof to the reinforcing wall 8. The stator core 9 is press fitted into the inner space defined by the axial ribs 10a to 10j to be held in position.

In the above-described construction, magnetomotive force distribution of the stator core 9 results in elliptic deformation (oscillation) thereof. The deformation or oscillation of the stator core 9 is transmitted through the reinforcing wall 8 to the side walls 4 and 5 of the stator main frame 2, thereby oscillating the side walls 4 and 5. Accordingly, the oscillation of the side walls 4 and 5 and accordingly, noise due to operation of the dynamoelectric machine are intensified with the increase in the rated power thereof. The above-described elliptic deformation of the stator core is conspicuous particularly in two-pole dynamoelectric machines.

To solve the above-described problem, the prior art has proposed another stator as shown in FIG. 27. In the shown stator, axial ribs 11a and 11b are welded to opposite portions of the outer periphery of the stator core 9. Supports 14a and 14b extend from the bottom wall 13 for supporting the ribs 11a and 11b respectively. Since this construction eliminates contact of the ribs 11a and 11b with the respective side walls 15 and 16 of the stator main frame 1, the oscillation of the side walls 15 and 16 can be reduced. Consequently, the noise due to operation of the dynamoelectric machine can be reduced even when the machine has a high rated power.

However, the above-described construction requires alignment of axes of the stator core 9 and the bearing brackets mounted on the stator main frame. The alignment is troublesome and accordingly, reduces the efficiency in the manufacture of the stators of the dynamoelectric machine.

SUMMARY OF THE INVENTION

Therefore, an object of the present invention is to provide a stator for dynamoelectric machines wherein the oscillation of the side walls of the stator main frame can be reduced such that the noise due to operation of the dynamoelectric machine can be reduced, and the efficiency in the manufacture of the stators for the dynamoelectric machines can be improved.

The present invention provides a stator for a dynamoelectric machine which includes a rotor, comprising a stator frame including a main frame and a plurality of axial ribs cylindrically arranged in the main frame to extend substantially parallel with an axis of rotation of the rotor, thereby defining a space, and a stator core formed of a stack of laminations of steel sheets and fitted in the space defined by the axial ribs to be held in position. The main frame includes a bottom wall, side walls standing from both radial ends of the bottom wall respectively, and connecting walls standing from both axial ends of the bottom wall and interconnecting both ends of the side walls, respectively. The axial ribs interconnect the connecting walls. Each axial rib has opposite ends connected to the connecting walls and an intermediate portion between the ends, the intermediate portion being spaced away from the side walls.

According to the above-described stator, an elliptic oscillation produced by the stator core is not directly transmitted to the side walls of the stator main frame since the axial ribs holding the stator core interconnect the connecting walls of the stator main frame, and the intermediate portions of the axial ribs are spaced away from the side walls of the stator main frame. Consequently, oscillation of the side walls and accordingly, noise due to operation of the dynamoelectric machine can be reduced. Furthermore, since the connecting walls of the stator main frame are connected to the axial ribs, the alignment of axes of the stator core and bearing brackets mounted on the stator main frame can be readily carried out.

The axial ribs are preferably disposed so that eight calculated values of second moments of areas in respective areas at both sides of four axes are each 80 percent of a maximum thereof or more, two of the four axes being a horizontal axis and a vertical axis passing through an axis of the stator core on a plane perpendicular to the axis, the other two axes being obtained by turning the horizontal and vertical axes 45 degrees about the axis of the stator core. This disposition of the axial ribs provides a minimum deviation of the axis of the stator core held by the axial ribs from an axis of a centering location of each bearing bracket mounting portion of the stator main frame, that is, the degree of concentricity can be improved. Consequently, the eccentricity of air gap in an iron core section of the dynamoelectric machine can be reduced and accordingly, production of electromagnetic oscillation can be restricted. Furthermore, since a secondary manufacturing for the centering location of each bearing bracket mounting portion of the stator main frame is eliminated, the manufacturing efficiency can be further improved.

The axial ribs except a pair vertically sandwiching the stator core are preferably disposed to be unsymmetrical with respect to the axis of the stator core. In this disposition of the axial ribs, no opposed axial ribs are on the major axis of the elliptical deformation due to the magnetomotive force of the stator core, except for the vertical direction. Since this can evade thrust between the axial ribs, deformation of the stator frame can be reduced. Consequently, an amount of electromagnetic oscillation transmitted from the stator core to the stator frame can be reduced.

The stator core may be press fitted in the space defined by the axial ribs to be held in position. The press fitting eliminates an adjustment for aligning the axes of the stator core and the centering location of each bearing bracket mounting section of the stator main frame. Consequently, the manufacturing efficiency can be further improved.

The stator preferably further comprises a reinforcing rib provided on a portion of the axial rib located over the stator core to extend tangentially with respect to an outer circumference of the stator core, said portion of the axial rib being located away from the axis of the stator core by a distance ⁴⁄₃ times as long as a neutral axis radius of an elliptic deformation due to a magnetomotive force of the stator core, the reinforcing rib being connected to the side walls of the stator main frame. In this construction, no tangential displacement component is produced during the elliptic deformation of the stator core at the portion of the axial rib located away from the stator core axis by the distance ⁴⁄₃ times as long as the neutral axis radius. Consequently, the tangential or horizontal displacement component of elliptic deformation of the stator core can be prevented from being transmitted through the reinforcing rib to the side walls of the stator main frame. Additionally, the reinforcing rib can improve the strength of the stator frame.

The reinforcing rib may be detachably attachable to the stator frame and displaceable along the axis of rotation of the rotor. This construction permits the natural frequency of the stator frame to be varied when the location of the reinforcing rib is changed.

The stator frame may further comprise one or more annular ribs connected to the intermediate portions of the axial ribs, the annular ribs being spaced away from the side walls of the main frame. Consequently, the strength of the stator frame can be improved. Furthermore, the elliptic oscillation of the stator core can be prevented from being directly transmitted to the side walls of the stator frame.

Each of the axial ribs may have flexibility so that a natural frequency of the stator frame is at or below a predetermined value a in Hz, the predetermined value a being defined by an expression, a=b/√2, where b is a fundamental frequency component of electromagnetic oscillation produced in the machine and is 100 or 120 Hz. Consequently, since resonance of the stator frame due to the electromagnetic oscillation produced in the dynamoelectric machine can be reduced or completely prevented, the efficiency in oscillation isolation in the dynamoelectric machine can be improved.

The axial ribs are preferably disposed to occupy locations on the circumference except the locations in a range of 210- to 330-degree points, exclusive a 270-degree point, when two intersections where a horizontal axis passing through an axis of the stator core intersects a circumference defined by the cylindrically arranged axial ribs are a zero-degree point and a 180-degree point respectively and other two intersections where a vertical axis passing through the axis of the stator core intersects the circumference are a 90-degree point and the 270-degree point respectively. The above-described arrangement of the axial ribs results in a reduction in an amount of electromagnetic oscillation transmitted from the stator core to the side walls of the stator frame, and this was experimentally confirmed. Consequently, the oscillation of the stator frame and the noise due to operation of the dynamoelectric machine can be further reduced.

Each of the connecting walls preferably includes an outer wall on which a bearing bracket is adapted to be mounted and an inner wall to which one ends of the axial ribs are connected. The stator frame preferably further includes a connecting axial rib interconnecting the outer and inner walls of each connecting wall. This connecting axial rib is disposed not to be aligned with the axial ribs. Since the inner wall of each connecting wall is rendered flexible, the electromagnetic oscillation produced in the stator core, even when it is transmitted through the axial ribs to each inner wall, is absorbed thereinto. Consequently, since an amount of electromagnetic oscillation transmitted to the outer wall of each connecting wall is reduced accordingly, the oscillation and noise due to operation of the dynamoelectric machine can be further reduced.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 5 is a top plan view of a stator frame used in a stator of a second embodiment in accordance with the present invention;

FIG. 6 is a longitudinal section taken along line 6—6 in FIG. 5;

FIG. 18 is a top plan view of a stator frame used in a stator of a fourth embodiment in accordance with the present invention;

FIG. 19 is a view similar to FIG. 2 in the fourth embodiment;

DETAILED DESCRIPTION OF THE PREFERRED EMBODIMENTS

Figure 1:
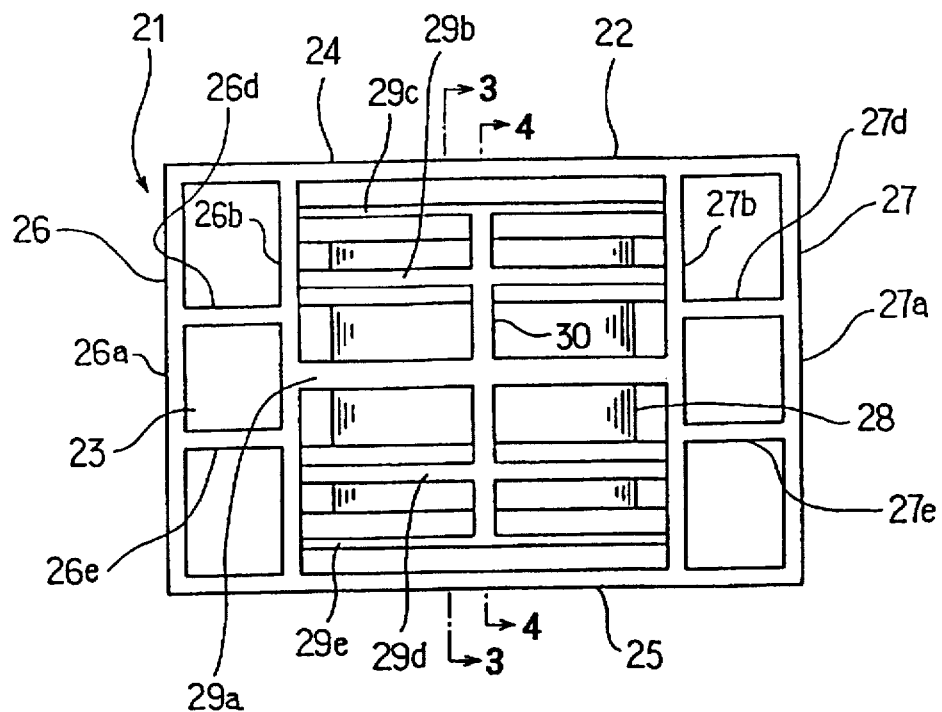
FIG. 1 is a top plan view of a stator frame used in a stator of a first embodiment in accordance with the present invention.
Figure 2:
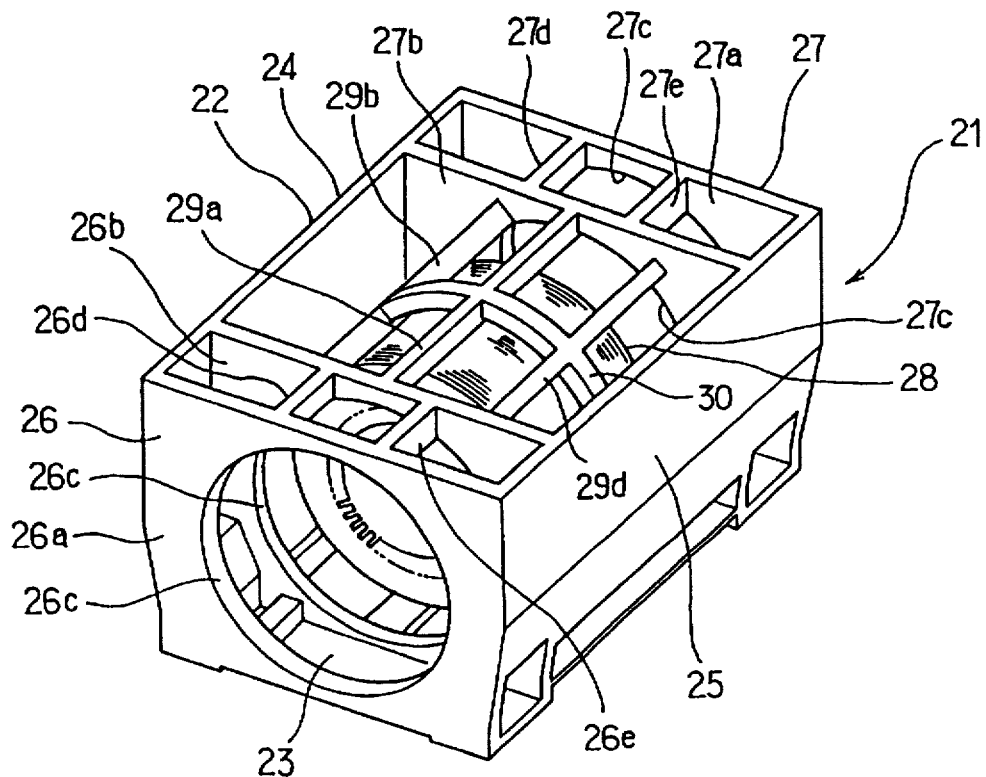
FIG. 2 is a perspective view of the stator frame.

A first embodiment of the present invention will be described with reference to FIGS. 1 to 4. Referring to FIGS. 1 and 2, a stator frame 21 used in a stator of a dynamoelectric machine is shown. The stator frame 21 includes a generally rectangular box-shaped main frame 22. The main frame 22 comprises a bottom wall 23, two side walls 24 and 25 standing from both ends of the bottom wall 23 extending horizontally as viewed in FIG. 1, respectively, and two connecting walls 26 and 27 standing from both ends of the bottom wall 23 extending vertically as viewed in FIG. 1 and interconnecting both ends of the side walls 24 and 25, respectively. The connecting walls 26 and 27 comprise outer walls 26a and 27a and inner walls 26b and 27b respectively. Outer surfaces of the outer walls 26a and 27a serve as mounting faces on which bearing brackets (not shown) are to be mounted, respectively. Connecting axial ribs 26d and 26e interconnect the outer and inner walls 26a and 26b. Connecting axial ribs 27d and 27e interconnect the outer and inner walls 27a and 27b. The connecting walls 26 and 27 have through holes 26c and 27c through which a generally annular stator core 28 is taken into and out of the stator frame, respectively. Each of the holes 26c and 27c is substantially circular and has a diameter slightly larger than an outer diameter of the stator core 28. The stator core 28 has a central bore in which a rotor (not shown) is adapted to be disposed.

Figure 3:
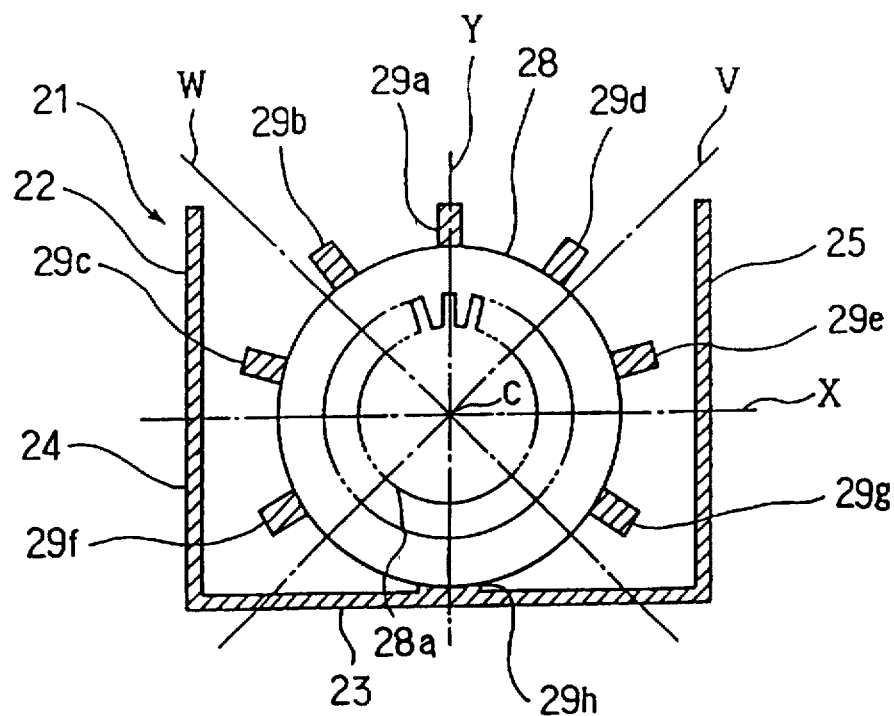
FIG. 3 is a longitudinal section taken along line 3—3 in FIG. 1.
Figure 4:
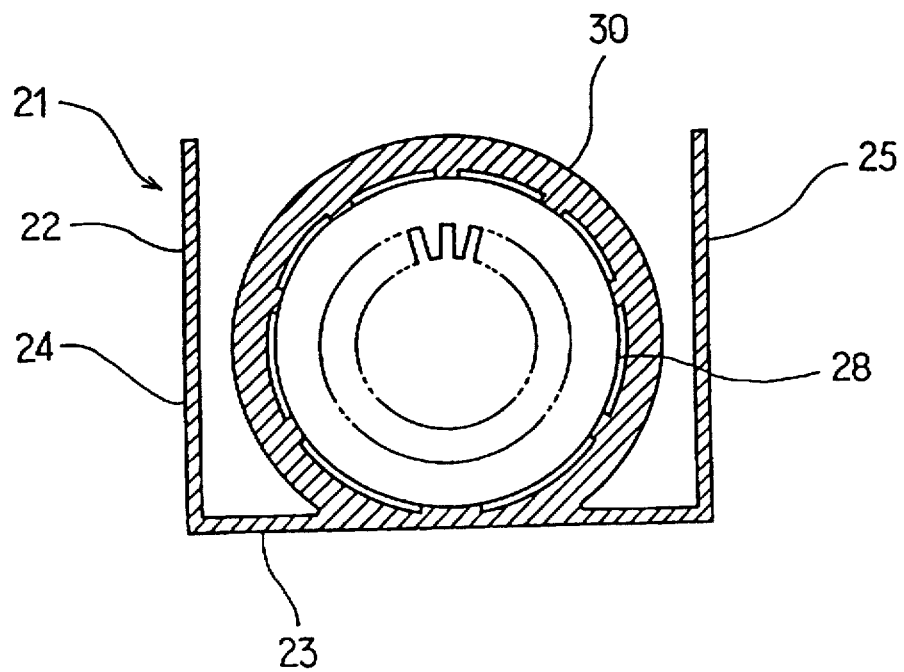
FIG. 4 is a longitudinal section taken along line 4—4 in FIG. 1.
Figure 7:
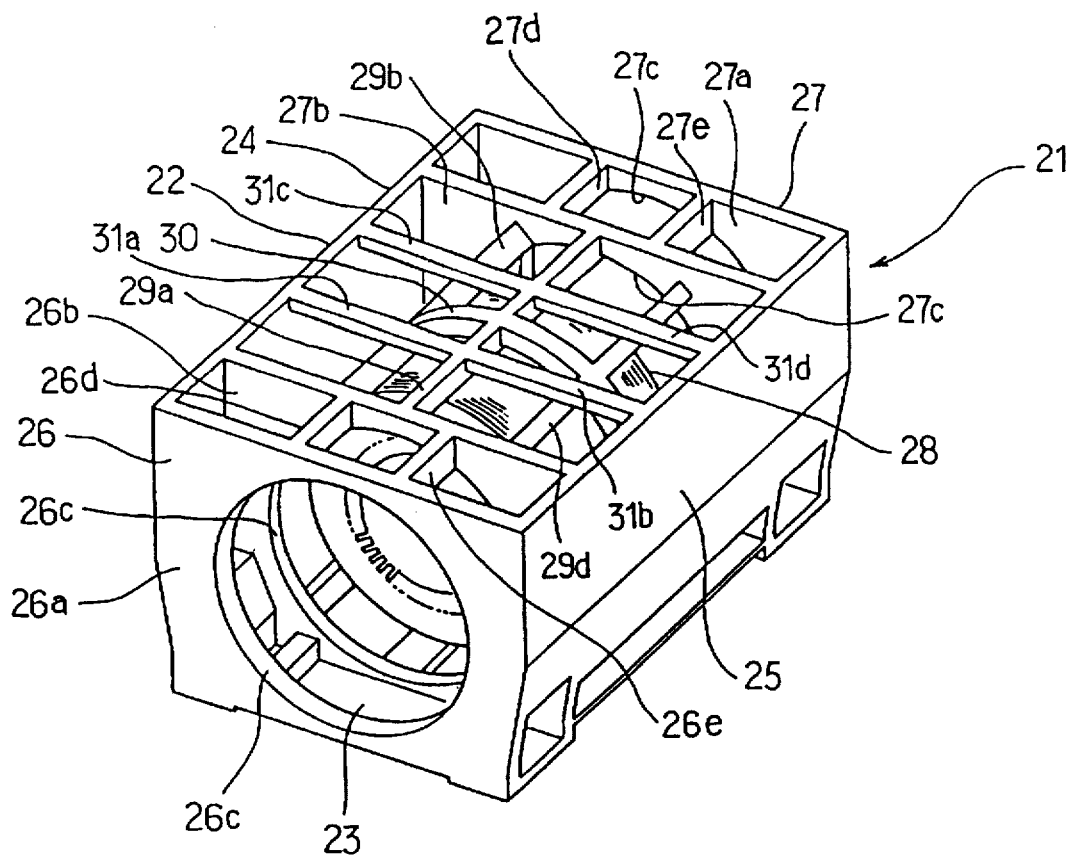
FIG. 7 is a view similar to FIG. 2 in the second embodiment.

A plurality of, for example, eight axial ribs 29a to 29h are provided in the stator main frame 22 to extend substantially parallel with an axis of rotation of the rotor in a cylindrical arrangement so that a space for the stator core 28 is defined by the ribs, as shown in FIGS. 1–3. The axial ribs 29a–29h have respective inner faces curved so as to constitute an inner circumference of an imaginary cylinder whose diameter is slightly smaller than the outer diameter of the stator core 28, whereby the stator core 28 is permitted to be press fitted into the space defined by the ribs. Both ends of each of the axial ribs 29a–29h are integrally connected to the inner walls 26b and 27b of the connecting walls 26 and 27 respectively. An annular rib 30 is integrally connected to the central portions of the axial ribs 29a–29h. Thus, the axial ribs 29a–29h are disposed to interconnect the inner walls 26b and 27b. The annular rib 30 is integrally connected at the lower portion thereof to the bottom wall 23 of the main frame 22 and is spaced away from the side walls 24 and 25, as is shown in FIG. 4. Consequently, the intermediate portions of the axial ribs 29a–29h between the respective opposite end are spaced away from the side walls 24 and 25 of the main frame 22.

The stator core 28 is press fitted into the space defined by the cylindrically arranged axial ribs 29a–29h to be held in position. The stator core 28 is formed of a stack of laminations of steel sheets each stamped out into a predetermined configuration. The stator core 28 has a central bore 28 a in which a rotor (not shown) is adapted to be disposed.

The arrangement of the axial ribs 29a–29h will now be described in detail with reference to FIG. 3. As shown, lines X and Y designate horizontal and vertical axes passing through an axis C of the stator core 28 on a plane perpendicular to the axis C respectively. Lines V and W designate two axes obtained by turning the horizontal and vertical axes X and Y 45 degrees respectively. In the arrangement of the eight axial ribs 29a–29h, they are adjusted in view of the sectional configuration and circumferential angle of each rib so that eight calculated values of second moments of areas or moments of inertia of areas in respective areas at both sides of the four axes V, W, X and Y are each 80 percent of a maximum thereof or more. For example, one of the eight calculated values concerning the area at one side of the axis V is a sum of the second moments of areas calculated with respect to the axial ribs located in the area at the side of the axis V. The single calculated value is obtained in the same manner regarding the area at the other side of the axis V. The other six calculated values are also obtained in the same manner as described above with respect to the areas at both sides of the axes W, X and Y. These values are obtained in the field of strength of materials.

The axial ribs 29b–29g except a pair of ribs 29a and 29h vertically sandwiching the stator core 28 are disposed to be unsymmetrical about the axis C of the stator core 28. Furthermore, the connecting axial ribs 26d, 26e, 27d and 27e are disposed so they are not aligned with the axial ribs 29a–29h. The stator frame 21 as described above is integrally molded out of a metal such as iron or aluminum with a mold. Alternatively, the stator frame 21 may be formed by welding steel plates.

According to the above-described embodiment, the axial ribs 29a–29h defining the space for the stator core 28 and holding the same in position are disposed so that they interconnect the walls 26b and 27b and so that the intermediate portions of the axial ribs 29a–29h are spaced away from the side walls 24 and 25 of the main frame 22. This construction prevents an elliptic oscillation (deformation) due to magnetomotive force distribution of the stator core 28 from being directly transmitted to the side walls 24 and 25 of the main frame 22. In particular, the oscillation typically produced in two-pole dynamoelectric machines can be prevented from being transmitted to the side walls. Consequently, the oscillation of the side walls 24 and 25 of the stator main frame 22 can be reduced such that the noise due to operation of the dynamoelectric machine can be reduced. Furthermore, since the axial ribs 29a–29h interconnect the inner walls 26b and 27b of the respective connecting walls 26 and 27, the axial ribs 29a–29h can be positioned readily and precisely by the inner walls 26b and 27b. Consequently, the alignment of the axes of the stator core 28 and the bearing brackets to be mounted on the stator main frame 22 can be readily carried out.

In the foregoing embodiment, the axial ribs 29a–29h are arranged so that the values of the geometrical moments of inertia at the of both sides of the respective axes X, Y, V and W are each 80 percent of the maximum of the values or more, as shown in FIG. 3. Accordingly, the deviation of the axis C of the stator core 28 held by the axial ribs 29a–29h from the axis of a centering location of each bearing bracket mounting portion of the main frame 22 can be minimized, that is, the degree of concentricity can be improved. Consequently, the eccentricity of air gap in an iron core section of the dynamoelectric machine can be reduced and accordingly, production of electromagnetic oscillation can be restricted.

More specifically, assume now that the geometrical moment of inertia about the axis X, for example, is deviated by u%. An amount of eccentricity ε of the axis C is obtained from the difference between flexural rigidity at both sides of the axis X by the following expression:

$$\epsilon = (s/2) \cdot (u/100)/\{(u/100)+2\}$$

where s is an iron core interference. For example, when the air gap G is 1 mm, the iron core interference is 0.2 mm and the maximum difference of the geometrical moment of inertia at both sides of the axis X is 10%, an amount of eccentricity ε/G of the axis C relative to the air gap of the iron core is obtained by:

$$\begin{aligned}\epsilon &= (0.2/2) \cdot (10/100)/\{(10/100)+2\} \\ &= 0.00476 \text{ mm.}\end{aligned}$$

Then, $$\begin{aligned}\epsilon/G &= 0.00476/1 \\ &= 0.00476.\end{aligned}$$

Thus, the eccentricity of the air gap can be limited to about 0.5%. Consequently, the number of manufacturing steps of the stators can be reduced with a result of improvement in the manufacturing efficiency since a secondary manufacturing for the centering location of each bearing bracket mounting portion of the stator main frame 22 is eliminated for the purpose of reduction of the air gap eccentricity.

In the foregoing embodiment, the axial ribs 29b–29g except a pair of ribs 29a and 29h vertically sandwiching the stator core 28 are disposed to be unsymmetrical with respect to the axis C of the stator core 28. Accordingly, no axial ribs are on the major axis of the elliptical deformation (oscillation) due to the magnetomotive force of the stator core 28. Since this can evade thrust between the axial ribs, deformation of the stator frame 21 can be reduced. Consequently, an amount of electromagnetic oscillation transmitted from the stator core 28 to the stator frame 21 can be reduced.

The stator core 28 is press fitted into the space defined by the cylindrically arranged axial ribs 29a–29h to be held in position. The press fitting eliminates the alignment of the axes of the stator core 28 and the centering location of each bearing bracket mounting portion of the stator main frame 22, further improving the manufacturing efficiency.

The connecting axial ribs 26d, 26e, 27d and 27e interconnecting the outer and inner walls 26a, 26b, 27a and 27b respectively are disposed not to be aligned with the axial ribs 29a–29h. This arrangement permits the inner walls 26b and 27b to be flexed. Accordingly, the electromagnetic oscillation produced in the stator core 28 is transmitted through the axial ribs 29a–29h to the inner walls 26b and 27b to be absorbed thereinto. Consequently, since an amount of electromagnetic oscillation transmitted to the outer walls 26a and 27a is reduced accordingly, noise due to operation of the dynamoelectric machine can be reduced.

Since a single annular rib 30 is connected to the central portions of the axial ribs 29a–29h in the foregoing embodiment, the strength of the stator frame 21 can be improved. Furthermore, the annular rib 30 is spaced away from the side walls 24 and 25. Consequently, since the elliptical oscillation of the stator core 28 is prevented from being transmitted to the side walls 24 and 25 of the stator frame 21, the oscillation of the walls 24 and 25 can be prevented and accordingly, the noise due to operation of the dynamoelectric machine can be further reduced.

FIGS. 5 to 11 illustrate a second embodiment of the present invention. The differences between the first and second embodiments will be described. Identical or similar parts are labeled by the same reference numerals as those in the first embodiment. The axial rib 29a located over the stator core 28 has reinforcing ribs 31a, 31b, 31c and 31d integrally formed on respective portions thereof located away from the axis C of the stator core 28 by a distance ⅓ times as long as a neutral axis radius R of the elliptic deformation due to a magnetomotive force of the stator core 28. The reinforcing ribs 31a–31d extend tangentially with respect to the outer circumference of the stator core 28. One ends of the reinforcing ribs 31a–31d are integrally connected to the side walls 24 and 25. The neutral axis radius R depends upon a radius R1 of a circle defined by the bottoms of slots of the stator core 28 and a radius R2 of a circle defined by the outer circumference of the stator core 28, as is shown in FIG. 6.

Figure 8:
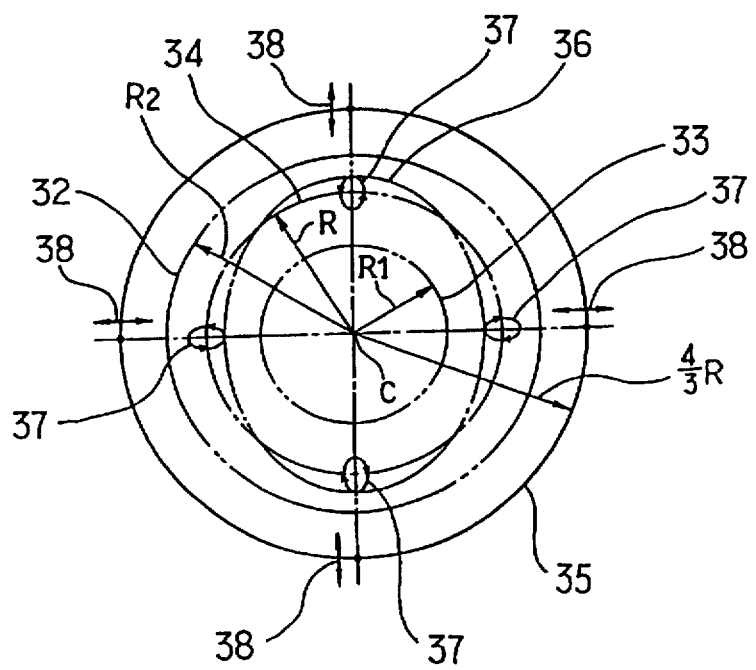
FIG. 8 illustrates an elliptic oscillation of the stator core produced by the magnetomotive force distribution.

FIG. 8 illustrates an elliptic oscillation of the stator core produced by the magnetomotive force distribution in a stator core of a two-pole dynamoelectric machine. The neutral axis radius R will be described in detail with reference to FIG. 8. A circle 32 designated by a two-dot chain line is defined by the outer circumference of the stator core 28. Reference symbol R2 designates the radius of the circle 32. A circle 33 designated by another two-dot chain line corresponds to the circumference of a circle defined by the bottoms of slots of the stator core 28. Reference symbol R1 designates the radius of the circle 33. A circle 34 designated by a chain line corresponds to the circumference of a neutral axis of the elliptical oscillation. Reference symbol R designates the radius of the circle 34. The neutral axis radius R is shown by the following expression:

$$R = r \cdot t/(1+t)$$

where $$t = -1 + (r/h) \ln[(1+h/2r)/(1-h/2r)];$$

$$h = R2 - R1;$$

and r is a radius of curvature of a concentric axis in a beam section when an annulus formed by the stator core 28 is taken as a curved beam.

A circle 35 designated by a solid line has a radius ⅓ times as long as the neutral axis radius R. An ellipse 36 designated by a chain line represents one form of elliptic deformation of the stator core 28. Each of small ellipses 37 represents a locus of displacement (deformation) at a given point on the stator core 28 when the one form of the elliptic deformation of the stator core 28 is turned under the influence of a rotating magnetic field. Each of arrows 38 represents a locus of displacement (deformation) at a point on the circumference of the circle having a radius ⅓ times as long as the neutral axis radius R when the one form of the elliptic deformation of the stator core 28 is turned under the influence of the rotating magnetic field.

The given point on the stator core 28 describes the ellipse 37 when the elliptic deformation 36 of the stator core 28 is rotated one turn. Accordingly, it can be understood that the given point is displaced radially with respect to the stator core 28 and tangentially with respect to the outer circumference thereof. On the other hand, an approximate calculation based on the strength of materials generally shows that only radial displacement as shown by arrows 38 occurs on the circumference of the circle 35 having a radius ⅓ times as long as the neutral axis radius R without the tangential displacement.

Accordingly, the reinforcing ribs 31a–31d are provided on the axial rib 29a located over the stator core 28 so as to extend tangentially (horizontally, in the embodiment) with respect to the outer circumference of the stator core 28 and so as to be located away from the axis C by the distance ⅓ times as long as the neutral axis radius R of the elliptic deformation due to the magnetomotive force of the stator core 28. The distal ends of the reinforcing ribs 31a–31d are connected to the side walls 24 and 25 of the main frame 22. In this construction, the tangential or horizontal component of elliptic deformation of the stator core 28 can be prevented from being transmitted through the reinforcing ribs 31a–31d to the side walls 24 and 25 of the stator main frame 22. In other words, the horizontal component of the elliptic deformation of the stator core 28 can be prevented from being transmitted to the side walls 24 and 25, or the side walls 24 and 25 can be isolated from oscillation even when the axial rib 29a is connected via the reinforcing ribs 31a–31d to the side walls 24 and 25. In the second embodiment, furthermore, the strength of the stator frame 21 can be improved since the reinforcing ribs 31a–31d connect the axial rib 29a to the side walls 24 and 25.

Figure 9:
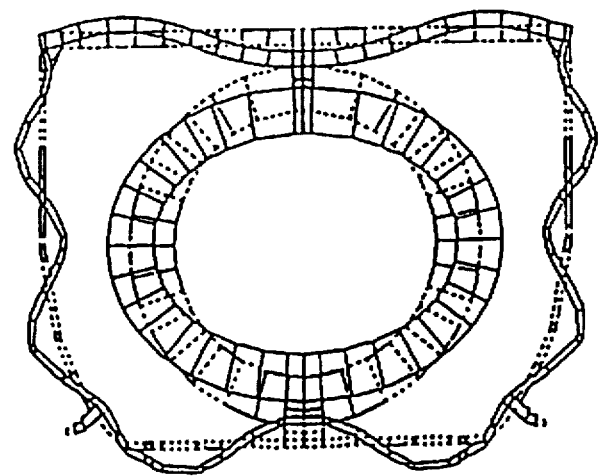
FIG. 9 illustrates horizontal elliptic deformation of the stator core and the stator frame.
Figure 10:
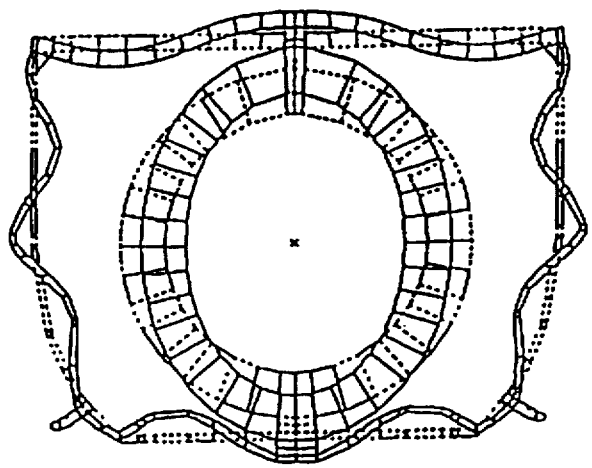
FIG. 10 illustrates vertical elliptic deformation of the stator core and the stator frame.
Figure 11A:
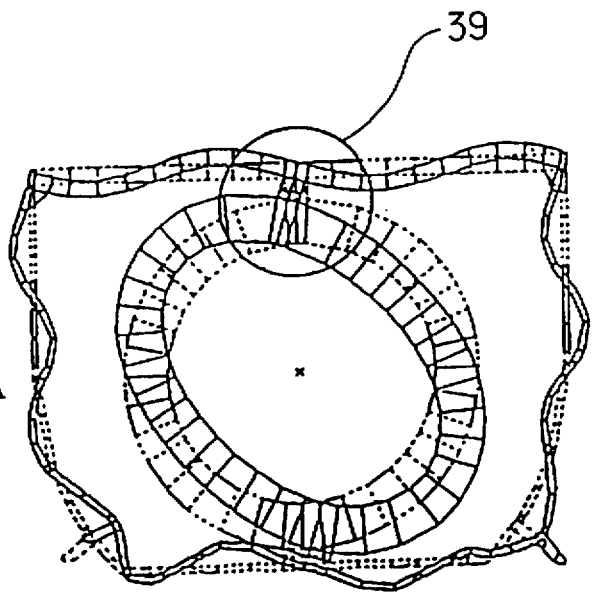
FIGS. 11A and 11B illustrate oblique elliptic deformation of the stator core and the stator frame.
Figure 11B:
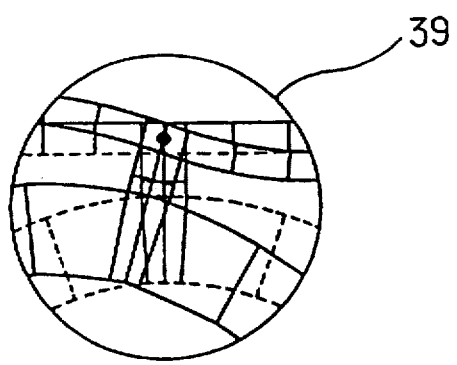

FIGS. 9 to 11 illustrate the results of eigenvalue analysis carried out to simulate the elliptic deformation of the stator core 28. In the analysis, the stator core support portions are modeled by the finite element method. FIG. 9 shows a horizontal elliptic deformation, FIG. 10 shows a vertical elliptic deformation, and FIGS. 11A and 11B show an oblique elliptic deformation. FIG. 11B is an enlarged view of the part 39 in FIG. 11A. The axial rib 29a is located over the stator core 28, and the reinforcing ribs 31a–31d are located away from the axis C by the distance ⅓ times as long as the neutral axis radius R, as described above. The results of the analysis show that the junctions between the axial rib 29a and the reinforcing ribs 31a–31d are not horizontally displaced. Thus, the oscillation of the horizontal component due to the elliptic deformation of the stator core 28 can be prevented from being transmitted to the side walls 24 and 25 of the stator frame 21, or the side walls 24 and 25 can be isolated from the oscillation of the horizontal component due to the elliptic deformation of the stator core 28.

Figure 12:
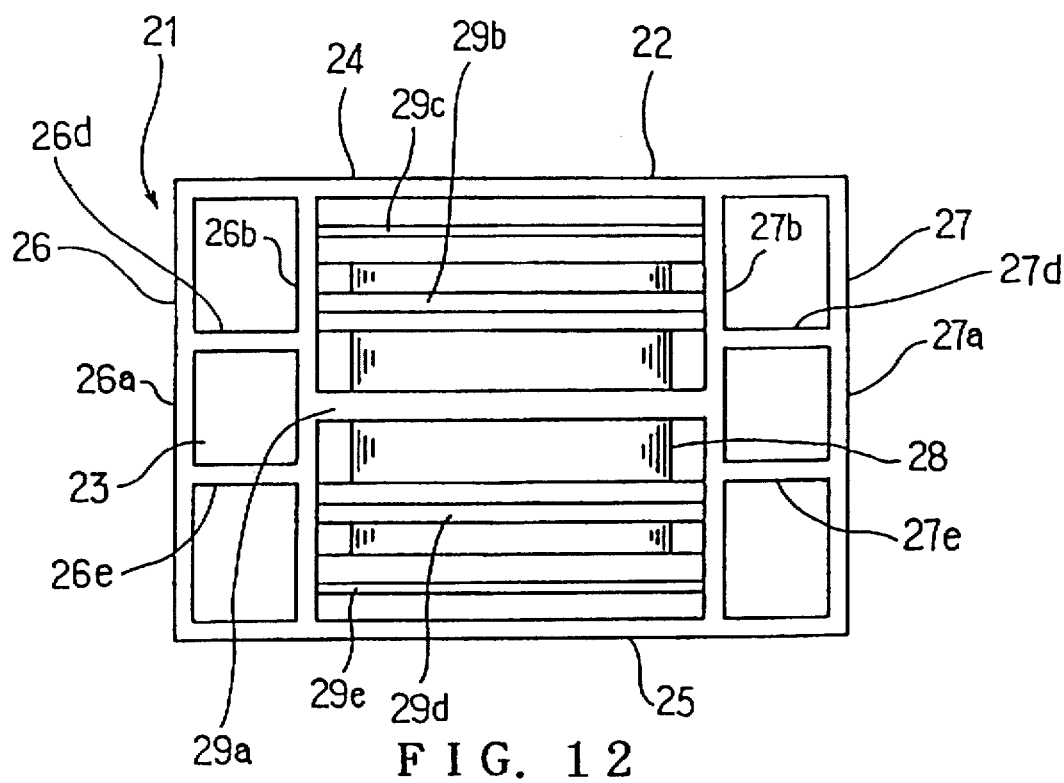
FIG. 12 is a top plan view of a stator frame used in a stator of a third embodiment in accordance with the present invention.
Figure 13:
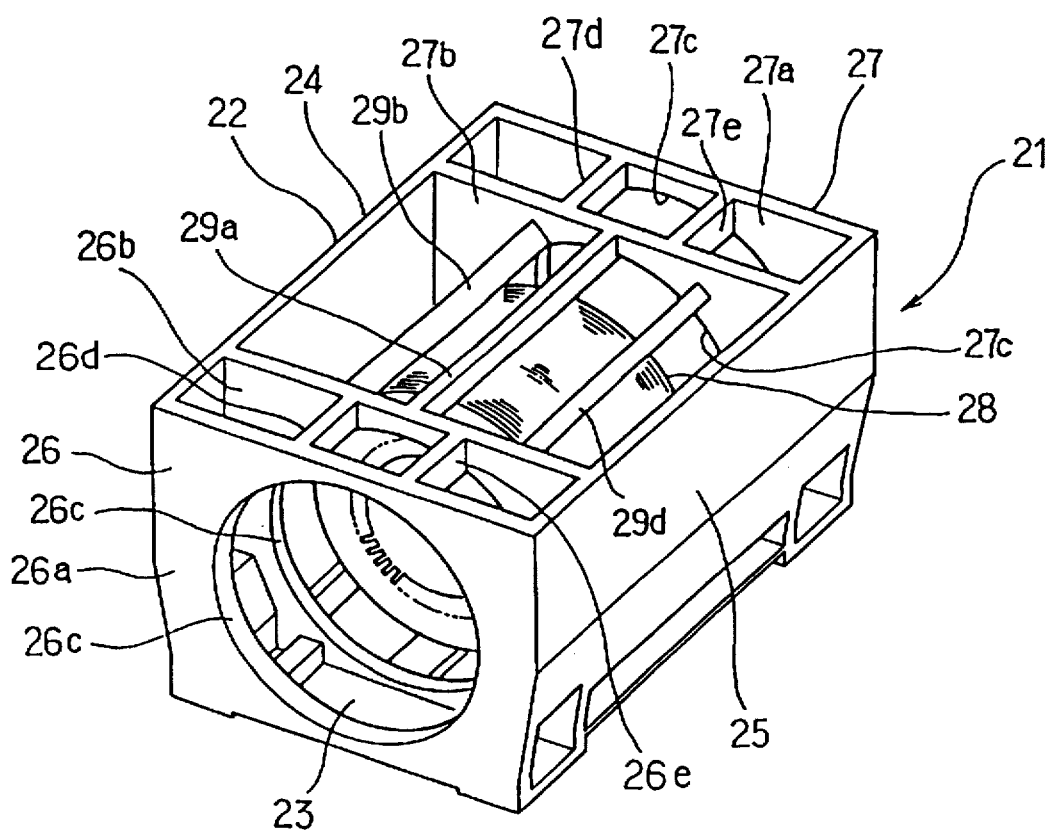
FIG. 13 is a view similar to FIG. 2 in the third embodiment.

FIGS. 12 to 17 illustrate a third embodiment of the present invention. The differences between the first and third embodiments will be described. Identical or similar parts are labeled by the same reference numerals as those in the first embodiment. The annular rib 30 connected to the central portions of the axial ribs 29a–29h in the first embodiment is eliminated in the third embodiment, as is shown in FIGS. 12 and 13. Thus, the annular rib 30 may not be provided when a high level of strength of the stator frame 21 is not required.

The connecting walls 26 and 27 comprise the outer walls 26a and 27a on which the bearing brackets are to be mounted, and the inner walls 26b and 27b to which both ends of the axial ribs 29a–29h are connected, respectively, as shown in FIGS. 12 and 13. The connecting axial ribs 26d, 26e, 27d and 27e interconnect the outer and inner walls 26a, 27a, 26b and 27b respectively. The connecting axial ribs 26d, 26e, 27d and 27e are disposed not to be aligned with the axial ribs 29a–29h. This arrangement permits flex of the inner walls 26b and 27b of the respective connecting walls 26 and 27. Accordingly, even when the electromagnetic oscillation produced in the stator core 28 is transmitted through the axial ribs 29a–29h to the inner walls 26b and 27b, it is absorbed into the inner walls 26b and 27b. Consequently, since an amount of electromagnetic oscillation transmitted to the outer walls 26a and 27a is reduced accordingly, noise due to operation of the dynamoelectric machine can be reduced.

Figure 14:
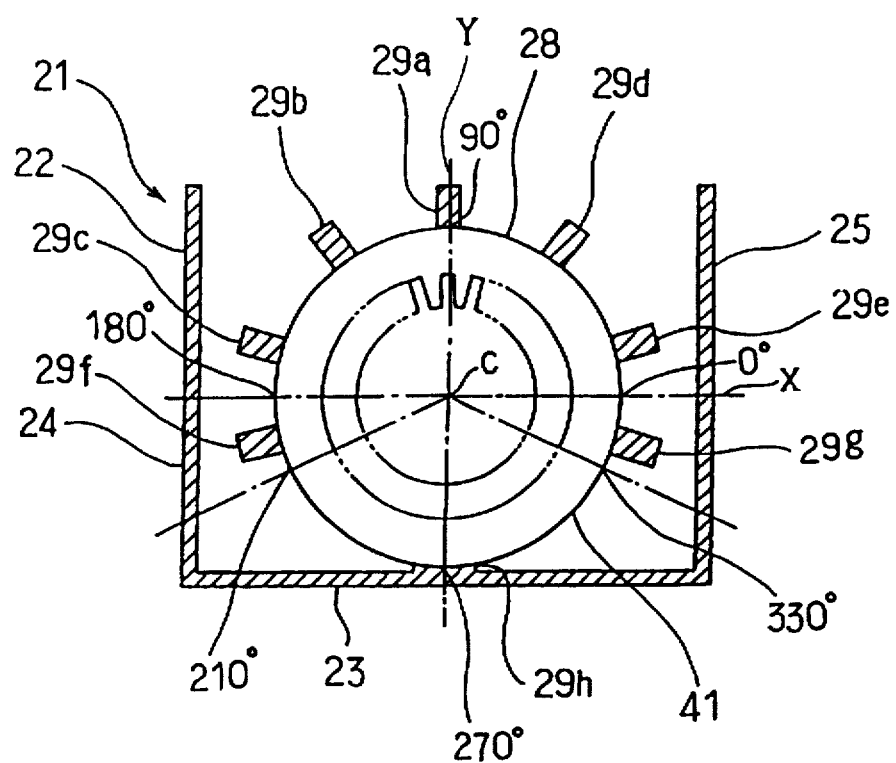
FIG. 14 is a view similar to FIG. 3 in the third embodiment.
Figure 15:
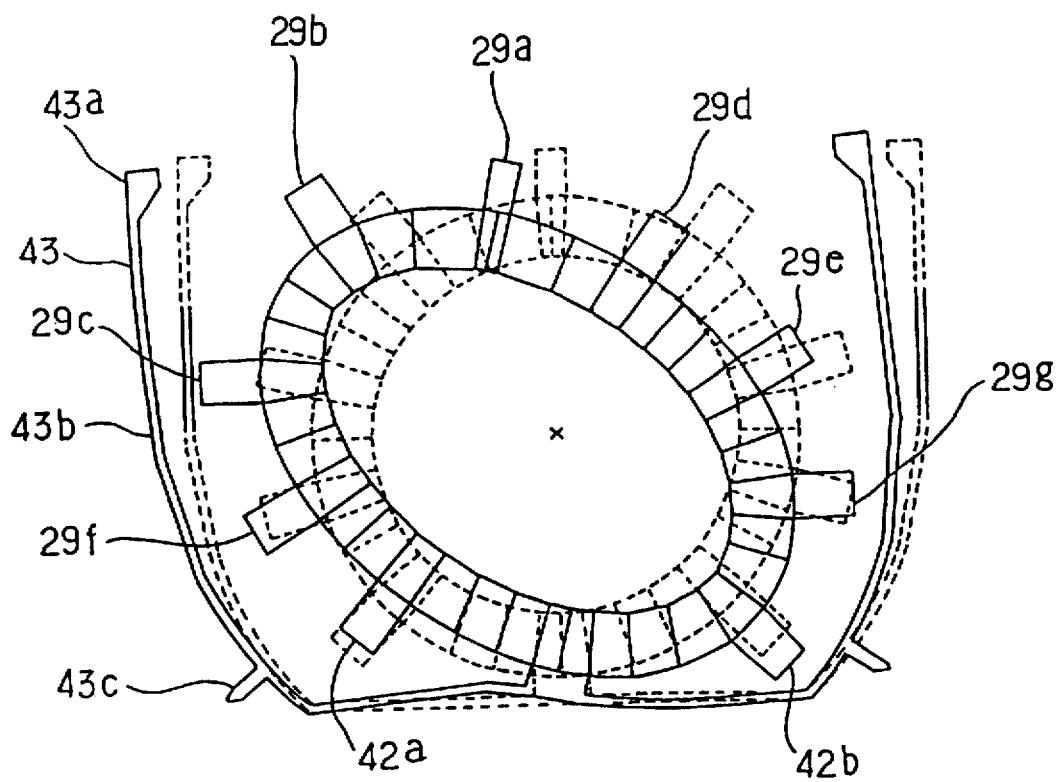
FIG. 15 illustrates the results of analysis of elliptic deformation by means of simulation of electromagnetic oscillation of the stator core.
Figure 16:
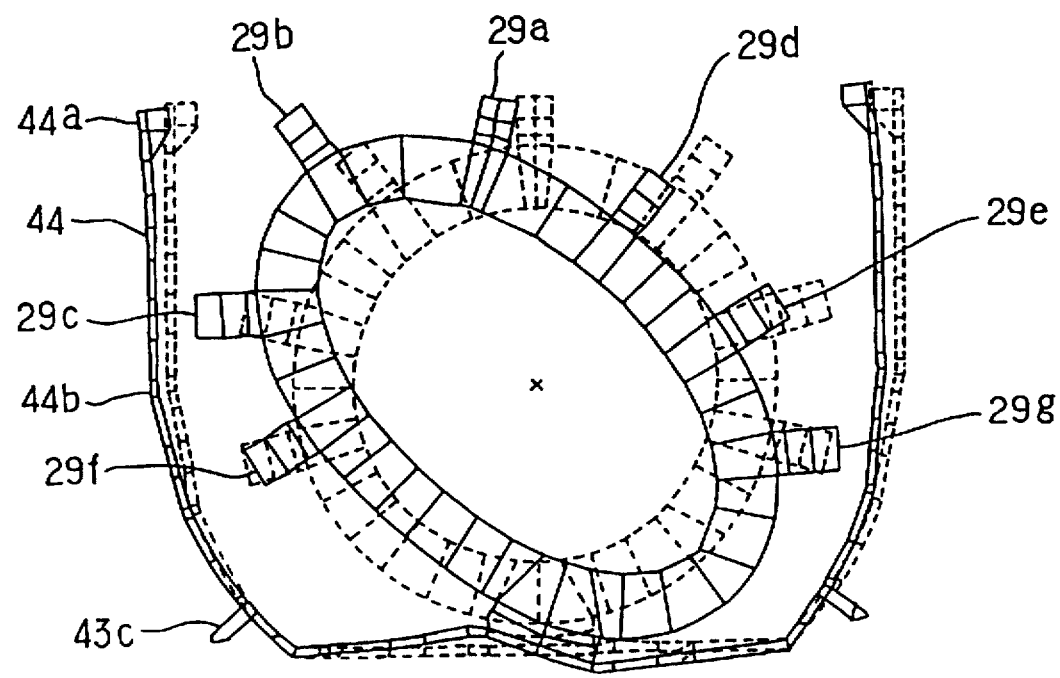
FIG. 16 illustrates the results of analysis of elliptic deformation by means of simulation of electromagnetic oscillation of the stator core.
Figure 17:
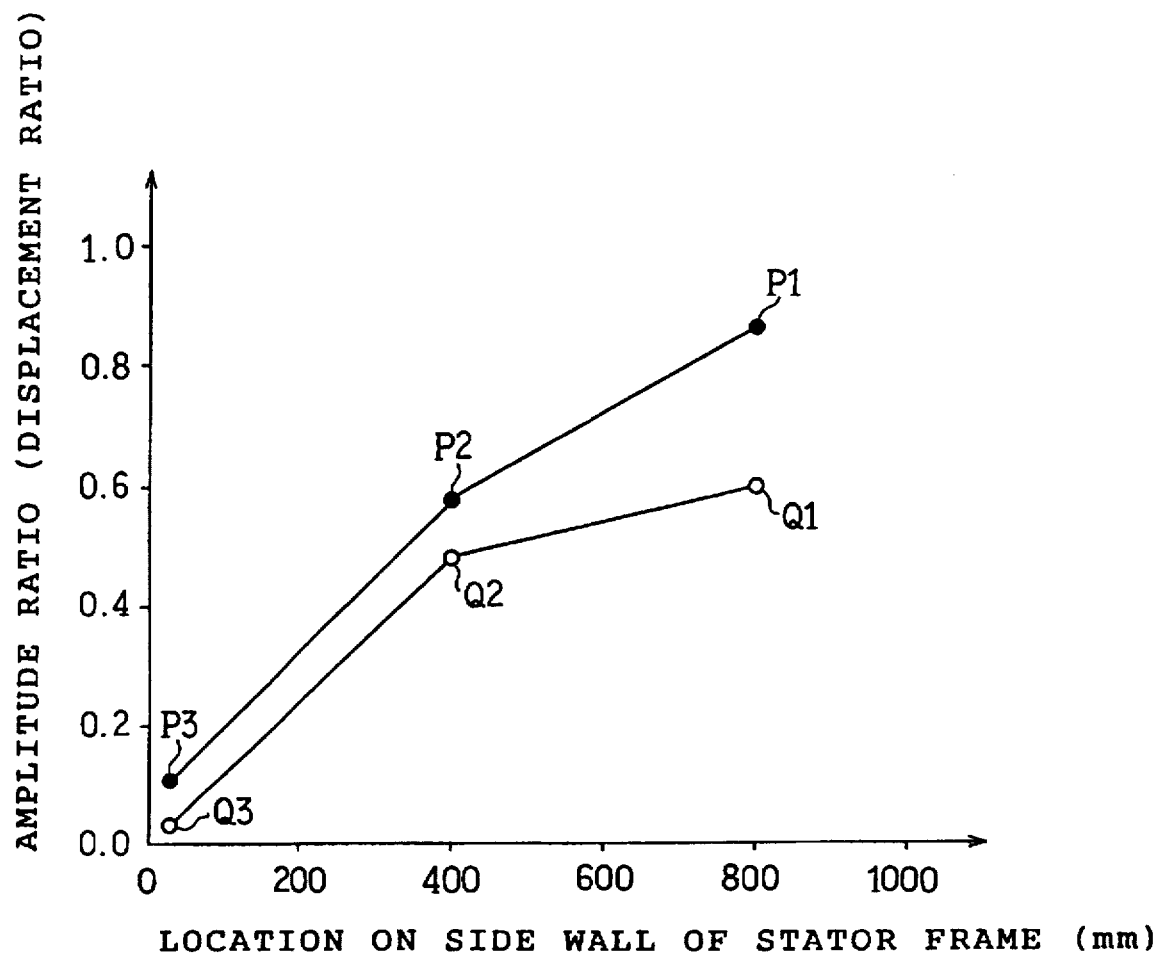
FIG. 17 is a graph showing amplitude ratios at respective locations on the side wall of the stator frame.

Referring to FIG. 14, the locations of two axial ribs 29f and 29g in the third embodiment differ from those in the first embodiment. A circumference 41 is defined by the cylindrically arranged axial ribs 29a–29h. The circumference 41 corresponds to the outer circumference of the stator core 28. A horizontal axis X passing through the axis C of the stator core 28 crosses the circumference 41 at two intersections. The right-hand intersection is referred to as "zero-degree point" and the left-hand intersection is referred to as "180-degree point," as viewed in FIG. 14. Furthermore, a vertical axis Y passing through the axis C of the stator core 28 crosses the circumference 41 at two intersections. The uppermost intersection on the circumference 41 is referred to as "90-degree intersection" and the lowermost point on the circumference 41 is referred to as "270-degree point," as viewed in FIG. 14. The axial ribs 29a–29h are arranged so as not to be located at the points in the range of 210 to 330 degrees except the 270-degree point. The axial rib 29f is located slightly above a 210-degree point on the circumference 41 or at a smaller angular point than the 210-degree point. The axial rib 29g is located slightly above a 330-degree point on the circumference 41 or at a larger point than the 330-degree point. When the axial ribs 29f and 29g are disposed at the above-described locations respectively, an amount of electromagnetic oscillation transmitted from the stator core 28 to the side walls 24 and 25 can be reduced. This was confirmed by an experiment carried out by the inventors. FIGS. 15 to 17 show the results of the experiment.

FIG. 15 illustrates the results of analysis of an elliptic deformation by means of simulation of the electromagnetic oscillation produced in the stator core 28 in an analysis model in which axial ribs 42a and 42b are disposed to be located at the points in the range of 210 to 330 degrees except the lowermost 270-degree point on the circumference 41. FIG. 15 shows that an elliptic oscillation in a 45-degree direction produces an oscillation amplitude (displacement) of the side walls 24 and 25 of the stator frame 21 when the axial ribs 42a and 42b are located at the points in the range of 210 to 330 degrees. FIG. 16 illustrates the results of analysis of an elliptic deformation by means of simulation of the electromagnetic oscillation produced in the stator core 28 in an analysis model in which no axial ribs are disposed to be located at the points in the range of 210 to 330 degrees except the lowermost 270-degree point on the circumference 41. FIG. 16 shows that when no axial ribs are disposed at the points in the range of 210 to 330 degrees except the 270-degree point, the oscillation amplitude (displacement) of the side walls 24 and 25 is reduced as compared with that in the construction in FIG. 15.

FIG. 17 graphs out the results of the analyses shown in FIGS. 15 and 16. Points P1, P2 and P3 in FIG. 17 denote deformation ratios (displacement ratios) in the upper end portion 43a, intermediate portion 43b and lower end portion 43c of the side wall 43 with respect to the axial rib 29c in FIG. 15 respectively. Points Q1, Q2 and Q3 in FIG. 17 denote deformation ratios (displacement ratios) in the upper end portion 44a, intermediate portion 44b and lower end portion 44c of the side wall 44 with respect to the axial rib 29c in FIG. 16 respectively. The deformation ratio (displacement ratio) is shown as an amplitude ratio (displacement ratio) in FIG. 17. FIG. 17 shows that the amplitude ratio is smaller in the construction of FIG. 16 than in the construction of FIG. 15, that is, that an amount of electromagnetic oscillation transmitted from the stator core 28 to the side walls 24 and 25 is reduced in the construction of FIG. 16 as compared with that in the construction of FIG. 15.

The stator of the third embodiment has a fundamental construction which is the same as that in the first embodiment. Accordingly, the same effect can be achieved in the third embodiment as in the first embodiment. Particularly in the third embodiment, the axial ribs 29a–29h are arranged so as not to be located at the points in the range of 210 to 330 degrees except the 270-degree point on the circumference 41. Consequently, since an amount of electromagnetic oscillation transmitted from the stator core 28 to the side walls 24 and 25 is reduced, an amount of noise produced by the operation of the dynamoelectric machine can be reduced.

FIGS. 18 and 19 illustrate a fourth embodiment of the present invention. The differences between the first and fourth embodiments will be described. Identical or similar parts are labeled by the same reference numerals as those in the first embodiment. In the fourth embodiment, in addition to the annular rib 30, other annular ribs 45 and 46 are provided at both sides of the annular rib 30 respectively. Thus, the three annular ribs 30, 45 and 46 are connected to the central portions of the axial ribs 29a–29h. The annular ribs 30, 45 and 46 are disposed to be away from the side walls 24 and 25 of the stator frame 21. The other construction of the stator in the fourth embodiment is the same as that in the first embodiment. Consequently, the same effect can be achieved in the fourth embodiment as that in the first embodiment.

Particularly in the fourth embodiment, the three annular ribs 30, 45 and 46 are connected to the central portions of the axial ribs 29a–29h. Consequently, the strength of the stator frame 21 can be improved. Furthermore, since the annular ribs 30, 45 and 46 are spaced away from the side walls 24 and 25, the elliptic oscillation of the stator core 28 can be prevented from being transmitted to the side walls 24 and 25 of the stator frame 21. Consequently, an amount of oscillation produced in the side walls 24 and 25 can be reduced, and accordingly, the noise due to operation of the dynamoelectric machine can be reduced.

Although the three annular ribs are provided on the stator frame 21 in the fourth embodiment, two, four or more annular ribs may be provided. Furthermore, one, two or more annular ribs may be provided in the stator of the third embodiment. In each of these cases, the strength of the stator frame 21 can be improved and the noise due to operation of the dynamoelectric machine can be reduced.

Figure 20:
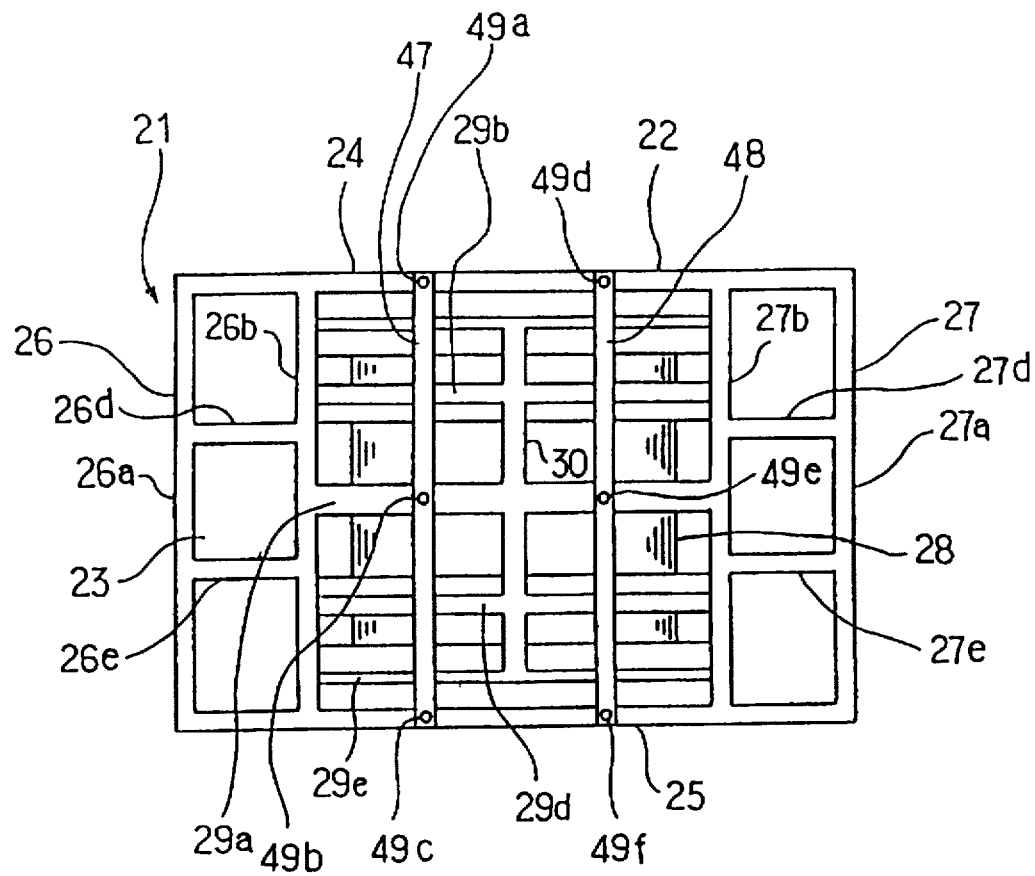
FIG. 20 is a top plan view of a stator frame used in a stator of a fifth embodiment in accordance with the present invention.
Figure 21:
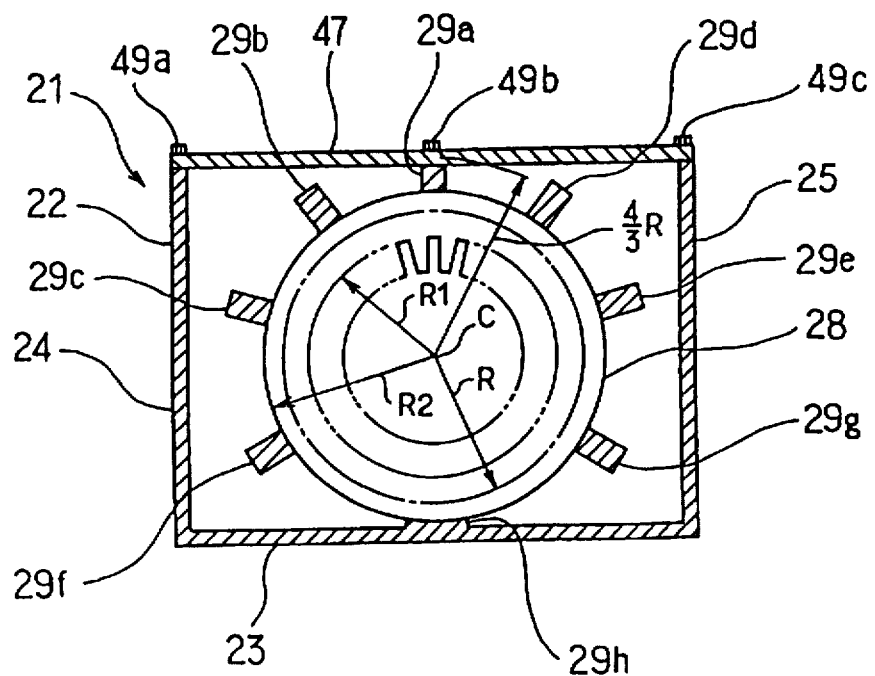
FIG. 21 is a view similar to FIG. 6 in the fifth embodiment.

FIGS. 20 and 21 illustrate a fifth embodiment of the present invention. The differences between the second and fifth embodiments will be described. Identical or similar parts are labeled by the same reference numerals as those in the second embodiment. Two other reinforcing ribs 47 and 48 are detachably attached to the stator frame 21, in the location of the reinforcing ribs 31a to 31d in the second embodiment. More specifically, the two reinforcing ribs 47 and 48 are fixed to the upper portions of the side walls 24 and 25 of the stator frame 21 and the axial rib 29a by bolts 49a to 49f. A number of screw holes into which the bolts 49a–49f are screwed axially with respect to the axis C of the stator core 28 are formed in the upper portions of the side walls 24 and 25 and the axial rib 29a, so that the locations of the reinforcing ribs 47 and 48 are permitted to be axially displaced or changed. In the above-described construction, three or more reinforcing ribs may be fixed to the stator frame 21. Furthermore, only one reinforcing rib or no reinforcing rib may be fixed to the stator frame 21. The other construction is the same as that in the second embodiment.

The same effect can be achieved in the fifth embodiment as in the second embodiment. Particularly in the fifth embodiment, the reinforcing ribs 47 and 48 attached to the stator frame 21 are detachable and axially displaceable. Accordingly, the natural frequency of the stator frame 21 can be varied when the locations of the reinforcing ribs or the number of reinforcing ribs are changed. Consequently, since the electromagnetic oscillation produced in the dynamoelectric machine (stator core) can be prevented from causing resonance of the stator frame, the oscillation isolating efficiency can be further improved.

The reinforcing ribs 47 and 48 detachably attached to the stator frame 21 may be applied to the stator of the third embodiment. In this case, too, the strength of the stator frame 21 can be improved, and the natural frequency of the stator frame 21 can be varied with the result that the noise due to operation of the dynamoelectric machine can be reduced.

Figure 22:
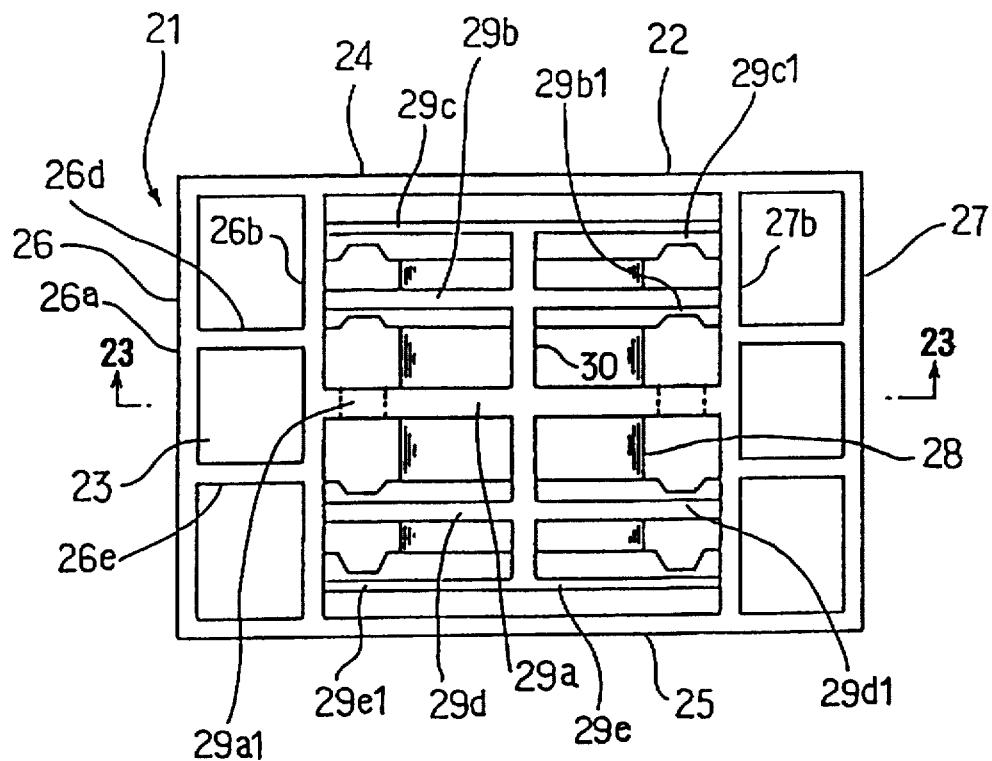
FIG. 22 is a top plan view of a stator frame used in a stator of a sixth embodiment in accordance with the present invention.
Figure 23:
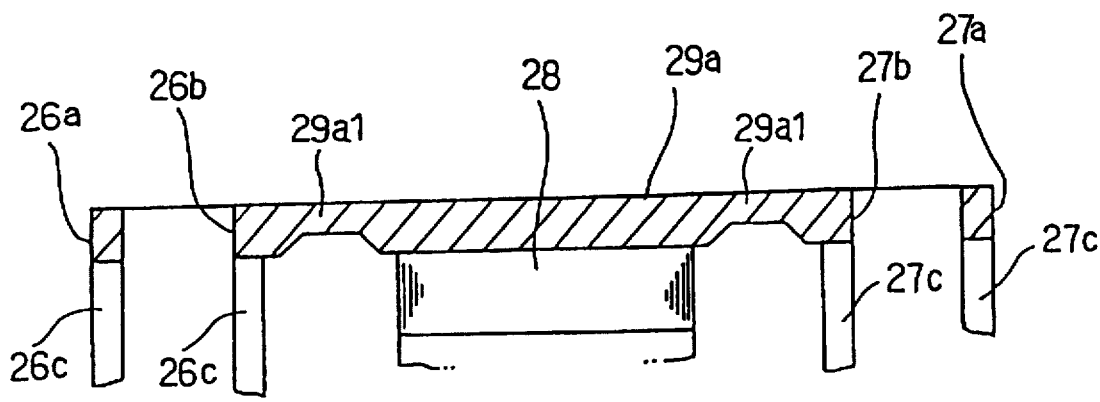
FIG. 23 is a longitudinal section taken along line 23—23 in FIG. 22.
Figure 24:
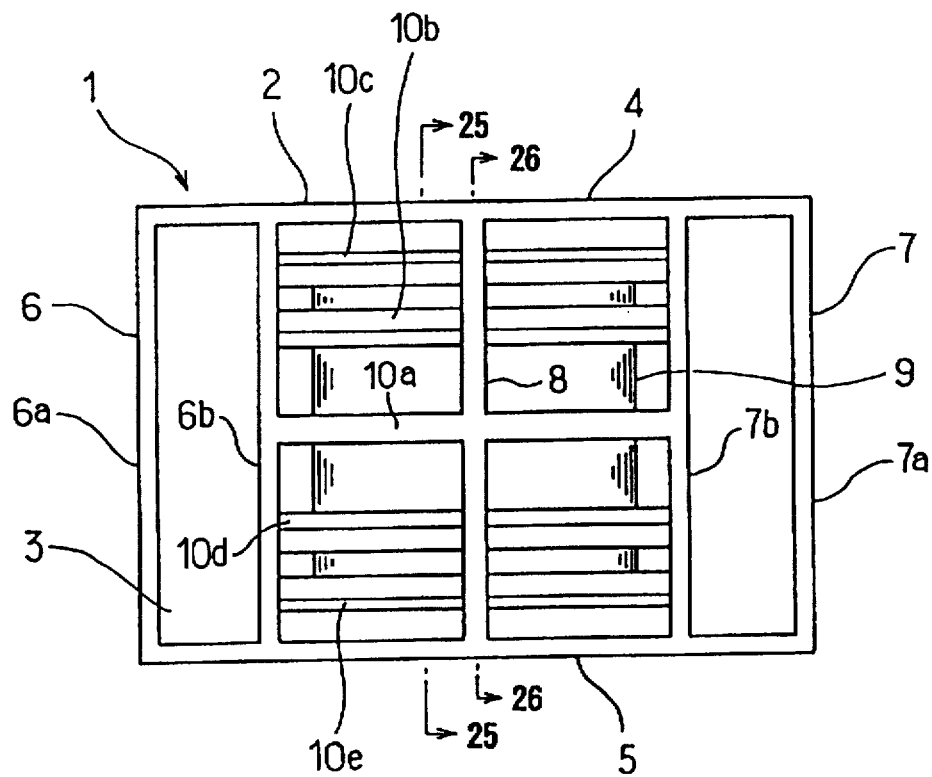
FIG. 24 is a top plan view of a stator frame used in a prior art stator.
Figure 25:
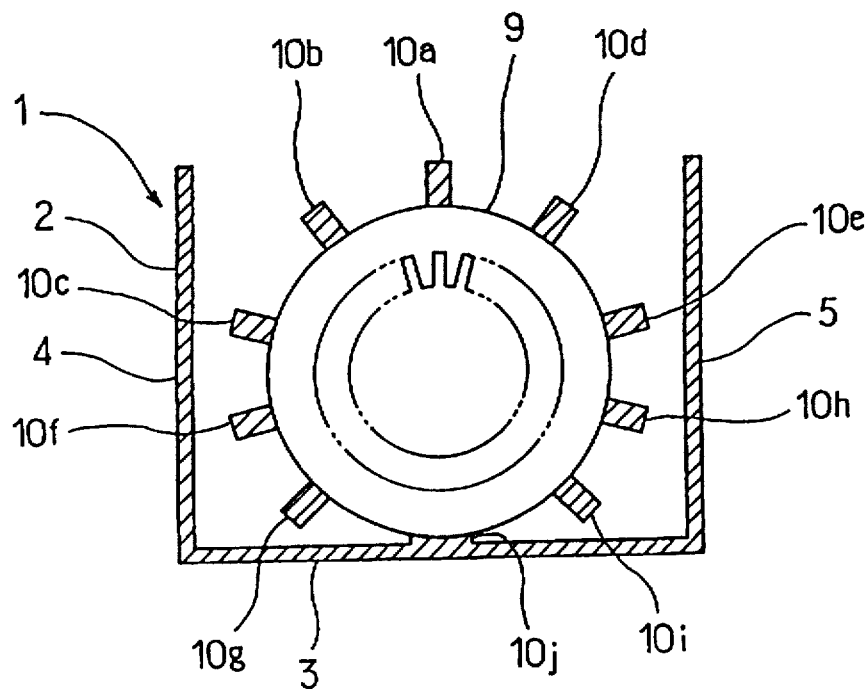
FIG. 25 is a longitudinal section taken along line 25—25 in FIG. 24.
Figure 26:
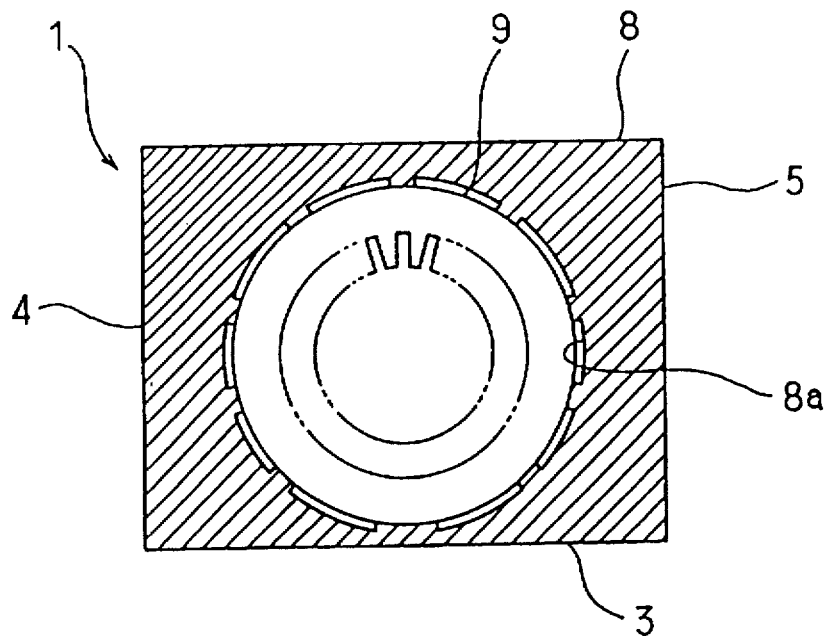
FIG. 26 is a longitudinal section taken along line 26—26 in FIG. 24.
Figure 27:
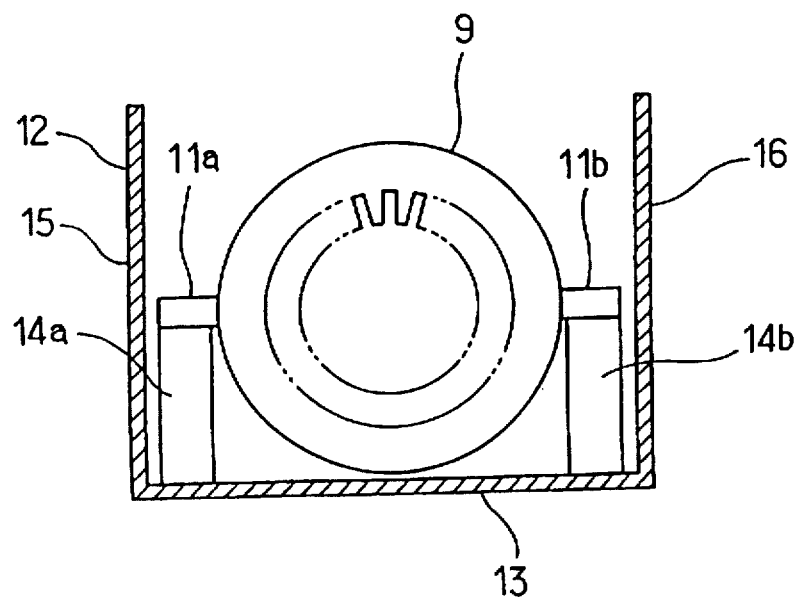
FIG. 27 is a longitudinal section of a stator frame used in another prior art stator.

FIGS. 22 and 23 illustrate a sixth embodiment of the present invention. The differences between the first and sixth embodiments will be described. Identical or similar parts are labeled by the same reference numerals as those in the first embodiment. The axial ribs 29a to 29g (axial ribs 29e and 29f not shown) have in both ends thereof thin portions 29a1 to 29g1 respectively so that each axial rib has flexibility. The natural frequency of the stator frame 21 is at or below a predetermined value a in Hz where $a=b/\sqrt{2}$ when b is a fundamental frequency component of the electromagnetic oscillation produced in the dynamoelectric machine and is 100 or 120 Hz. The other construction is the same as that in the first embodiment.

The same effect can be achieved in the sixth embodiment as in the first embodiment. Particularly in the sixth embodiment, each of the axial ribs 29a to 29g has flexibility so that the natural frequency of the stator frame 21 is at or below the value of a Hz. Consequently, resonance of the stator frame due to the electromagnetic oscillation produced in the dynamoelectric machine (stator core) can be reduced or completely prevented. Thus, the oscillation isolating efficiency of the dynamoelectric machine can be further improved, and the noise due to operation thereof can be reduced.

Although all the reinforcing ribs 29a–29g each have flexibility in the sixth embodiment, in some embodiments fewer than all of the axial ribs may have flexibility. Furthermore, the construction in which the axial ribs 29a–29g have flexibility for reduction of the natural frequency of the stator frame to or below the value of a Hz may be applied to the stator of the third embodiment. In this case, too, the noise due to operation of the dynamoelectric machine can be reduced.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A stator for a dynamoelectric machine which includes a rotor, comprising:
   a stator core: and
   a stator frame including:
      a main frame; and
      a plurality of axial ribs cylindrically arranged in the main frame to extend substantially parallel with an axis of rotation of the rotor, thereby defining a space; and
   wherein the main frame includes:
      a bottom wall having two radial ends and two axial ends;
      two side walls standing from both radial ends of the bottom wall respectively, with each side wall having two ends; and
      two connecting walls standing from both axial ends of the bottom wall and interconnecting both ends of the side walls, respectively; and
      wherein each axial rib has two opposite ends respectively connected to the respective connecting walls and an intermediate portion between the ends, the intermediate portion being spaced away from the side walls;
      wherein the axial ribs except a pair vertically sandwiching the stator core are disposed to be unsymmetrical with respect to an axis of the stator core; and
      wherein the stator core formed of a stack of laminations of steel sheets and fitted in the space defined by the axial ribs to be held in position.

2. A stator according to claim 1, wherein:
   a first axis is a horizontal axis perpendicular to a central axis of the stator core;
   a second axis is a vertical axis perpendicular to the central axis of the stator core;
   a third axis is an axis which is at a 45○ angle to the first axis and perpendicular to the central axis of the stator core;
   a fourth axis is at a 45' angle to the first axis, a 45' angle to the second axis and perpendicular to the central axis of the stator core;
   a first moment is the moment of inertia of the annular ribs disposed on a first side of the first-axis with respect to the first axis;
   a second moment is the moment of inertia of the annular ribs disposed on a second side of the first axis with respect to the first axis;
   a third moment is the moment of inertia of the annular ribs disposed on a first side of the second axis with respect to the second axis;
   a fourth moment is the moment of inertia of the annular ribs disposed on a second side of the second axis with respect to the second axis;
   a fifth moment is the moment of inertia of the annular ribs disposed on a first side of the third axis with respect to the third axis;
   a sixth moment is the moment of inertia of the annular ribs disposed on a second side of the third axis with respect to the third axis;
   a seventh moment is the moment of inertia of the annular ribs disposed on a first side of the fourth axis with respect to the fourth axis;
   an eighth moment is the moment of inertia of the annular ribs disposed on a second side of the fourth axis with respect to the fourth axis;
   the axial ribs are disposed so that there exists a number n such that the first through eighth moments are all within a range of n−10% to n+10%.

3. A stator according to claim 1, further comprising a reinforcing rib provided on a portion of the axial rib located over the stator core to extend tangentially with respect to an outer circumference of the stator core, the portion of the axial rib being located away from an axis of the stator core by a distance ⅘ times as long as a neutral axis radius of an elliptic deformation due to a magnetomotive force of the stator core, the reinforcing rib being connected to the side walls of the stator main frame.

4. A stator according to claim 1, wherein the stator frame further comprises one or more annular ribs connected to the intermediate portions of the axial ribs together, the annular ribs being spaced away from the side walls of the main frame.

5. A stator according to claim 1, wherein the axial ribs are disposed to occupy locations on the circumference, and are not disposed in a range between the 210-degree and 330-degree points, with the exception that a rib may be disposed at the 270-degree point, where two intersection points where a horizontal axis passing through an axis of the stator core intersects a circumference defined by the cylindrically arranged axial ribs define a zero-degree point and a 180-degree point respectively and two intersection points where a vertical axis passing through the axis of the stator core intersects the circumference define a 90-degree point and the 270-degree point respectively.

6. A stator according to claim 1, wherein each of the connecting walls includes an outer wall on which a bearing bracket is adapted to be mounted and an inner wall to which one ends of the axial ribs are connected and the stator frame further includes a connecting axial rib interconnecting the outer and inner walls of each connecting wall, the connecting axial rib being disposed not to be aligned with the axial ribs.

7. A stator for a dynamoelectric machine which includes a rotor, comprising:
   a stator core: and
   a stator frame including:
      a main frame; and
      a plurality of axial ribs cylindrically arranged in the main frame to extend substantially parallel with an axis of rotation of the rotor, thereby defining a space; and a reinforcing rib provided on a portion of the axial rib located over the stator core to extend tangentially with respect to an outer circumference of the stator core, the portion of the axial rib being located away from an axis of the stator core by a distance ⅘ times as long as a neutral axis radius of an elliptic deformation due to a magnetomotive force of the stator core; and
   wherein the main frame includes:
      a bottom wall having two radial ends and two axial ends, the reinforcing rib being connected to the side walls of the stator main frame;
      two side walls standing from both radial ends of the bottom wall respectively, with each side wall having two ends; and
      two connecting walls standing from both axial ends of the bottom wall and interconnecting both ends of the side walls, respectively; and
      wherein each axial rib has two opposite ends respectively connected to the respective connecting walls and an intermediate portion between the ends, the intermediate portion being spaced away from the side walls; and wherein the stator core formed of a stack of laminations of steel sheets and fitted in the space defined by the axial ribs to be held in position.

8. A stator according to claim 7, wherein a plurality of the reinforcing ribs are detachably attached to the stator frame by respective bolts and displaceable along the axis of rotation of the rotor.

9. A stator for a dynamoelectric machine which includes a rotor, comprising:

a stator core: and a stator frame including:

a main frame; and a plurality of axial ribs cylindrically arranged in the main frame to extend substantially parallel with an axis of rotation of the rotor, thereby defining a space; and wherein the main frame includes:

a bottom wall having two radial ends and two axial ends;

two side walls standing from both radial ends of the bottom wall respectively, with each side wall having two ends;

two connecting walls standing from both axial ends of the bottom wall and interconnecting both ends of the side walls, respectively, each connecting wall including an outer wall on which a bearing bracket is adapted to be mounted and an inner wall to which one ends of the axial ribs are connected; and a connecting axial rib interconnecting the outer and inner walls of each connecting wall, the connecting axial rib being disposed not to be aligned with the axial ribs; and wherein each axial rib has two opposite ends respectively connected to the respective connecting walls and an intermediate portion between the ends, the intermediate portion being spaced away from the side walls; and wherein the stator core formed of a stack of laminations of steel sheets and fitted in the space defined by the axial ribs to be held in position.

\* \* \* \* \*